United States Patent
Jang et al.

(10) Patent No.: US 10,723,360 B2
(45) Date of Patent: Jul. 28, 2020

(54) APPARATUS AND METHOD FOR ESTIMATING RADIUS OF CURVATURE OF VEHICLE

(71) Applicants: Hyundai Motor Company, Seoul (KR); Kia Motors Corporation, Seoul (KR)

(72) Inventors: Young Jin Jang, Seoul (KR); Jun Yeon Park, Incheon (KR); Soung Han Noh, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 409 days.

(21) Appl. No.: 15/836,605

(22) Filed: Dec. 8, 2017

(65) Prior Publication Data

US 2019/0111935 A1   Apr. 18, 2019

(30) Foreign Application Priority Data

Oct. 18, 2017   (KR) .................. 10-2017-0135091

(51) Int. Cl.
*B60W 40/10*       (2012.01)
*B60W 30/14*       (2006.01)
*B60W 40/13*       (2012.01)

(52) U.S. Cl.
CPC ............ *B60W 40/10* (2013.01); *B60W 30/14* (2013.01); *B60W 40/13* (2013.01); *B60W 2510/20* (2013.01); *B60W 2520/105* (2013.01); *B60W 2520/125* (2013.01); *B60W 2520/14* (2013.01); *B60W 2530/10* (2013.01); *B60W 2720/10* (2013.01)

(58) Field of Classification Search
CPC .... B60W 40/10; B60W 40/103; B60W 30/14; B60W 30/13; B60W 30/045; B62D 6/00
USPC ............................................................. 701/1
See application file for complete search history.

(56) References Cited

U.S. PATENT DOCUMENTS

| 2006/0015239 A1* | 1/2006 | Higuchi | ............... B60T 7/12 |
| | | | 701/72 |
| 2007/0227789 A1* | 10/2007 | Imura | ............... B60K 6/44 |
| | | | 180/65.235 |
| 2014/0316668 A1* | 10/2014 | Akiyama | ............... B60T 7/22 |
| | | | 701/70 |
| 2015/0329046 A1* | 11/2015 | Igarashi | ............... G08G 1/165 |
| | | | 340/435 |

FOREIGN PATENT DOCUMENTS

| KR | 20010059067 A | 7/2001 |
| KR | 20080032288 A | 4/2008 |

* cited by examiner

*Primary Examiner* — Tan Q Nguyen
(74) *Attorney, Agent, or Firm* — Slater Matsil, LLP

(57) ABSTRACT

Disclosed is an apparatus and method for estimating a radius of curvature of a vehicle. An apparatus for estimating a radius of curvature of a vehicle includes a processor, a memory for storing a program to be executed in the processor. The program includes instructions for estimating a first radius of curvature of the vehicle based on a yaw rate of the vehicle, estimating a second radius of curvature of the vehicle based on a lateral acceleration of the vehicle, and determining a final radius of curvature of the vehicle by combining the first radius of curvature and the second radius of curvature.

20 Claims, 4 Drawing Sheets

APPARATUS AND METHOD FOR ESTIMATING RADIUS OF CURVATURE OF VEHICLE

CROSS-REFERENCE TO RELATED APPLICATIONS

This application claims priority to Korean Patent Application No. 10-2017-0135091, filed on Oct. 18, 2017, which application is hereby incorporated herein by reference.

TECHNICAL FIELD

The present invention relates to vehicles, and more particularly, to an apparatus and method for estimating radius of curvature of a vehicle.

BACKGROUND

In general, when a vehicle travels on a curved road or a driver performs a steering operation, it may be required to estimate a radius of curvature of the moving vehicle. The estimation of the radius of curvature of the moving vehicle should be necessarily applied to realize a smart cruise control system which is a recently preferred vehicle convenience.

In the conventional technique for estimating a radius of curvature of a vehicle, a radius of curvature of a vehicle was estimated based on a yaw rate of the vehicle, a steering angle of the driver, and a velocity of the vehicle. However, because the conventional technique for estimating a radius of curvature of a vehicle is realized based on the assumption that in most cases, a change in a traveling velocity of a vehicle is not large (the vehicle moves mainly at a constant speed), accuracy of estimating the radius of curvature greatly deteriorates when the magnitude of the deceleration or acceleration of the vehicle is large. In other words, because the conventional technique for estimating a radius of curvature of a vehicle may not consider a slip occurring in a vehicle when the vehicle is accelerated or decelerated, a difference between the estimated radius of curvature of the vehicle and an actual radius of curvature of the vehicle is large.

SUMMARY

Accordingly, an aspect of the present invention is to provide an apparatus and method for estimating a radius of curvature of a vehicle, which estimates a radius of curvature of a vehicle based on an acceleration of a vehicle such that a radius of curvature of a vehicle traveling on a curved road may be accurately estimated in consideration of a slip of the vehicle when the vehicle is decelerated or accelerated, and selectively applies a radius of curvature estimated based on a yaw rate of the vehicle and a radius of curvature estimated based on an acceleration of the vehicle according to a change in a velocity of the vehicle.

An embodiment of the present invention provides an apparatus for estimating a radius of curvature, the apparatus including a first curvature radius calculating unit configured to estimate a radius of curvature of a driving vehicle based on a yaw rate of the vehicle, a second curvature radius calculating unit configured to estimate a radius of curvature of the vehicle based on a lateral acceleration of the vehicle, and a curvature radius determining unit configured to determine a final radius of curvature of the vehicle by combine the estimated radius of curvature estimated by the first curvature radius calculating unit and the estimated radius of curvature estimated by the second curvature radius calculating unit.

According to an embodiment of the present invention, the first curvature radius calculating unit may estimate a radius of curvature based on the yaw rate and a velocity of the vehicle using an equation $$\rho = \frac{V_x}{\hat{\gamma}}$$

($\rho$ refers to the estimated radius of curvature, Vx is the velocity of the vehicle, and $\hat{\gamma}(k)$ is the yaw rate).

According to an embodiment of the present invention, the second curvature radius calculating unit may estimate a radius of curvature based on a lateral acceleration of the vehicle and the velocity of the vehicle using an $$\rho = \frac{V_x^2}{A_y}$$

($\rho$ refers to the estimated radius of curvature, Vx refers to the velocity of the vehicle, Ay is the lateral acceleration of the vehicle).

According to the embodiment of the present invention, the curvature radius determining unit may determine the final estimated radius of curvature by combining, based on the magnitude of a forward acceleration of the vehicle, a first estimated radius of curvature estimated by the first curvature radius calculating unit and a second estimated radius of curvature estimated by the second curvature radius calculating unit.

According to the embodiment of the present invention, the curvature radius determining unit may determine the final estimated radius of curvature by applying a weight to the first estimated radius of curvature and the second estimated radius of curvature based on the magnitude of the forward acceleration of the vehicle.

According to the embodiment of the present invention, the weight may be determined as 0 when the magnitude of the forward acceleration is lower than a predetermined first reference value, may be determined as 1 when the magnitude of the forward acceleration exceeds a predetermined second reference value, and may be determined to be linearly changed in a range of 0 to 1 when the magnitude of the forward acceleration is in a range of the first reference value to the second reference value, and the curvature radius determining unit may multiply the weight by the second estimated radius of curvature, may multiply a value obtained by subtracting the weight from 1 by the first estimated radius of curvature, and may sum the two multiplied values to determine the final estimated radius of curvature.

According to the embodiment of the present invention, the curvature radius determining unit may determine the second estimated radius of curvature as the final estimated radius of curvature when the magnitude of the forward acceleration is not less than a predetermined reference value, and may determine the first estimated radius of curvature as the final estimated radius of curvature when the magnitude of the forward acceleration is lower than the reference value.

An embodiment of the present invention also provides a method for estimating a radius of curvature of a vehicle, the method including a first estimation step of estimating a radius of curvature of a driving vehicle based on a yaw rate of the vehicle, a second estimation step of estimating a radius of curvature of the vehicle based on a lateral acceleration of the vehicle, and determining a final estimated radius of curvature of the vehicle by combining the estimated radii of curvature estimated in the first estimation step and the second estimation step, respectively, with each other.

According to an embodiment of the present invention, because a radius of curvature of a vehicle is estimated in consideration of a moving trajectory of the vehicle, which is not reflected on a yaw rate due to a slip of the vehicle, in addition to an estimated radius of curvature estimated based on the yaw rate of the vehicle, the radius of curvature of the vehicle may be more accurately estimated in consideration of the slip even when the vehicle decelerates/accelerates while traveling on a curved road.

Further, according to the embodiment of the present, because the final radius of curvature of the vehicle is determined by properly combining the radius of curvature estimated based on the yaw rate and the radius of curvature estimated in consideration of the slip of the vehicle based on the lateral acceleration of the vehicle, the radius of curvature may be properly estimated according to a driving state of the vehicle without an excessive error that is reflected on the estimated radius of curvature estimated by any one technique.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF ILLUSTRATIVE EMBODIMENTS

The present invention relates to an apparatus and method for estimating a radius of curvature of a vehicle, and more particularly, to an apparatus and method for estimating a radius of curvature of a vehicle, which may accurately estimate a radius of curvature of rotation of a vehicle by selectively applying a radius of curvature of a vehicle, which is calculated based on a yaw rate of the vehicle, and a radius of curvature of the vehicle, which is calculated based on an acceleration of the vehicle.

Hereinafter, a vehicle curvature radius estimating apparatus and method according to various embodiments will be described in more detail with reference to the accompanying drawings.

Figure 1:
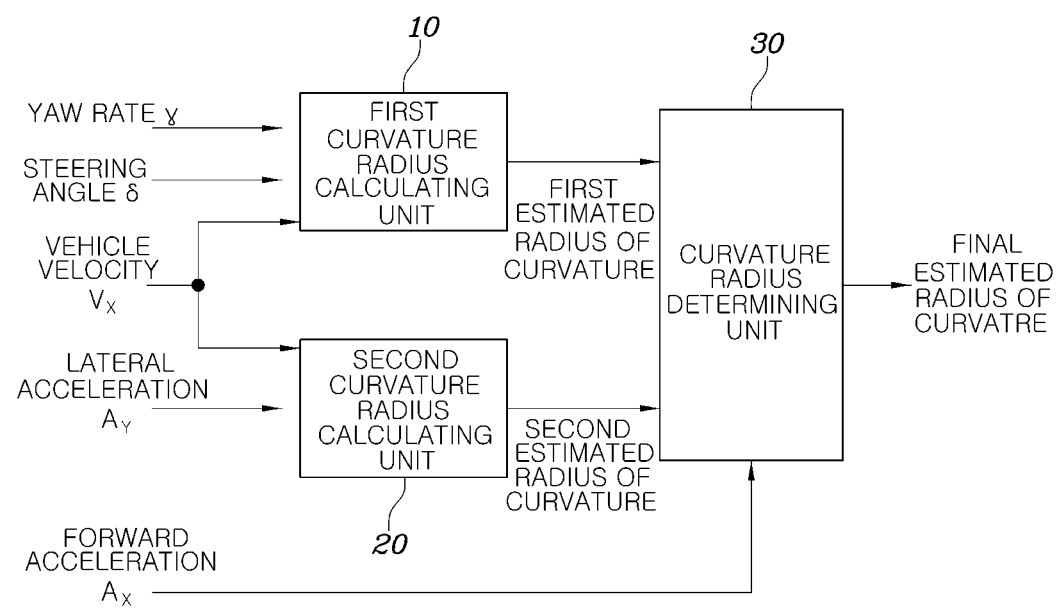
FIG. 1 is a block diagram illustrating a vehicle curvature radius estimating apparatus according to an embodiment of the present invention.

FIG. 1 is a block diagram illustrating a vehicle curvature radius estimating apparatus according to an embodiment of the present invention.

Referring to FIG. 1, the vehicle curvature radius estimating apparatus may include a first curvature radius calculating unit 10 configured to estimate a radius of curvature of a traveling vehicle based on a yaw rate of the vehicle, a steering angle of a driver, and a velocity of the vehicle, a second curvature radius calculating unit 20 configured to estimate a radius of curvature of the vehicle based on the velocity of the vehicle and a lateral acceleration of the vehicle, and a curvature radius determining unit 30 configured to determine a final radius of curvature of the traveling vehicle by combining the estimated radius of curvature estimated by the first curvature radius calculating unit 10 and the estimated radius of curvature estimated by the second curvature radius calculating unit 20 with each other based on a forward acceleration of the vehicle.

The first curvature radius calculating unit 10 may estimate the radius of curvature based on the yaw rate of the vehicle. A yaw corresponding to left/right turn with respect to the center of the vehicle traveling on a curved road occurs in the vehicle, and the radius of curvature of the vehicle may be estimated based on a degree to which the yaw changes. For example, when the yaw rate is relatively large, a sudden turn is made, and thus, the radius of curvature is small. Further, when the yaw rate is relatively small, a gentle turn is made, and thus, the radius of curvature is relatively large.

The first curvature radius calculating unit 10 may estimate the radius of curvature by applying various yaw rate-based curvature radius estimating techniques according to the related art.

Figure 2:
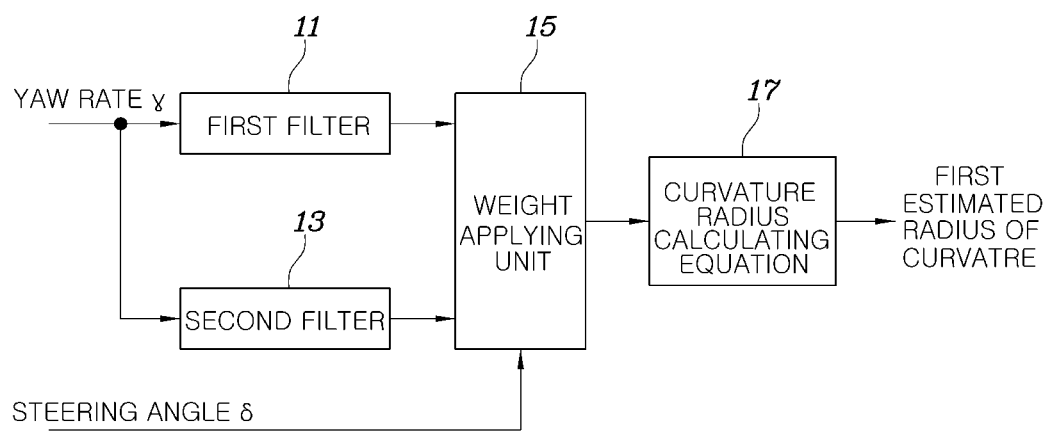
FIG. 2 is a block diagram illustrating an example of a first curvature radius calculating unit of the vehicle curvature radius estimating apparatus according to the embodiment of the present invention.

FIG. 2 is a block diagram illustrating an example of a first curvature radius calculating unit of the vehicle curvature radius estimating apparatus according to the embodiment of the present invention.

Referring to FIG. 2, the first curvature radius calculating unit 10 may estimate the radius of curvature by using the yaw rate $\gamma$, the velocity Vx of the vehicle, and the steering angle $\delta$ of the driver.

The yaw rate may be provided as a signal having a value of a yaw rate detected by a sensor installed in the vehicle. A yaw rate filtered by using two filters, that is, a first filter 11 and a second filter 12, having different responsiveness according to situations may be used for the yaw rate signal. In this way, the use of a plurality of filters reflects that on an actual road, the yaw rate signal is affected highly sensitively to driving situations (a condition and a roughness of a road surface, a steering operation of the driver, and the like).

For example, when the driver inputs a steering operation, the yaw rate signal is processed by using a filter (here, the first filter having rapid responsiveness, so that the yaw rate signal is sensitive to a change in a radius of curvature in a curved road. In contrast, when the driver does not input a steering operation, the radius of curvature is estimated by using a signal processed to be insensitive to an external environment such as a road surface by using a filter (here, the second filter 12) having relatively slow responsiveness.

The filters 11 and 12 applied to the first curvature radius calculating unit 10 may be based on a Kalman filter as represented in Equation (1). Here, the estimated values are determined by using the yaw rate signal of the vehicle and probabilistic characteristics of the yaw rate signal. The filter 11 having rapid responsiveness is designed to have a large update gain K, and the filter 12 having slow responsiveness is designed to have a small update gain K.

$$\hat{\gamma}(k+1|k+1) = \hat{\gamma}(k+1|k) + K \cdot (z(k) - \hat{\gamma}(k+1|k)) \tag{1}$$

Here, z(k) refers to a yaw rate velocity (measured value), and $\hat{\gamma}(k)$ refers to a measured value of the yaw rate.

A weight applying unit 15 applies a weight according to the steering angle of the driver. The weight may be determined in a range of 0 to 1 depending on the magnitude of the steering angle of the driver. For example, the weight is 1 when the magnitude of the steering angle of the driver is lower than a first reference value, the weight is 0 when the magnitude of the steering angle exceeds a second reference value that is larger than the first reference value, and the weight is linearly changed in a range of 0 to 1 when the magnitude of the steering angle is not less than the first reference value and is not more than the second reference value.

The steering angle of the driver may be obtained through a sensor provided in a steering wheel system of a vehicle, and the absolute value of the steering angle may be taken and applied to determine the weight.

The weight applying unit 15 calculates the yaw rate signal to which the weight is applied, and at this time, calculates the yaw rate signal based on degrees of reflection of output values of different filters, which are determined depending on the weight. When the weight applying unit 15 sets the weight to become smaller if the steering angle of the driver is large, the final yaw rate may be determined as {(1−weight)*yaw rate 1+(weight)*yaw rate 2)} (here, the yaw rate 1 is a yaw rate processed by the first filter 11 having rapid responsiveness, and the yaw rate 2 is a yaw rate processed by the second filter 12 having slow responsiveness), which is represented as Equation (2).

$$\gamma(k) = (1-W) \cdot \hat{\gamma}_1(k|k) + W \cdot \hat{\gamma}_2(k|k) \quad (2)$$

Here, subscripts 1 and 2 refer to the first and the second filter, respectively, and W means a weight determined according to a steering angle as described above.

A curvature radius calculating equation 17 may determine the radius of curvature by using Equation (3).

$$\rho = \frac{V_x}{\hat{\gamma}} \quad (3)$$

In Equation (3), ρ refers to a first estimated radius of curvature, and Vx refers to a velocity of the vehicle.

In this way, the first curvature radius calculating unit 10 may estimate the radius of curvature of the vehicle based on the yaw rate of the vehicle and the velocity of the vehicle. The radius of curvature estimated by the curvature radius calculating unit 10 is estimated based on an assumption that a slip does not occur in the vehicle, and the vehicles moves in accordance with the steering angle input by the driver.

However, in an actual vehicle driving environment, when the vehicle is driving on a curved road, the slip occurs in the vehicle according to a road condition, a mechanical condition of the vehicle, and a change in the velocity of the vehicle, such as acceleration or deceleration (that is, understeer or oversteer) In this case, because rotation paths of the vehicle differs from each other even at the same yaw rate, the radius of curvature of the vehicle may be larger or smaller.

Figure 3:
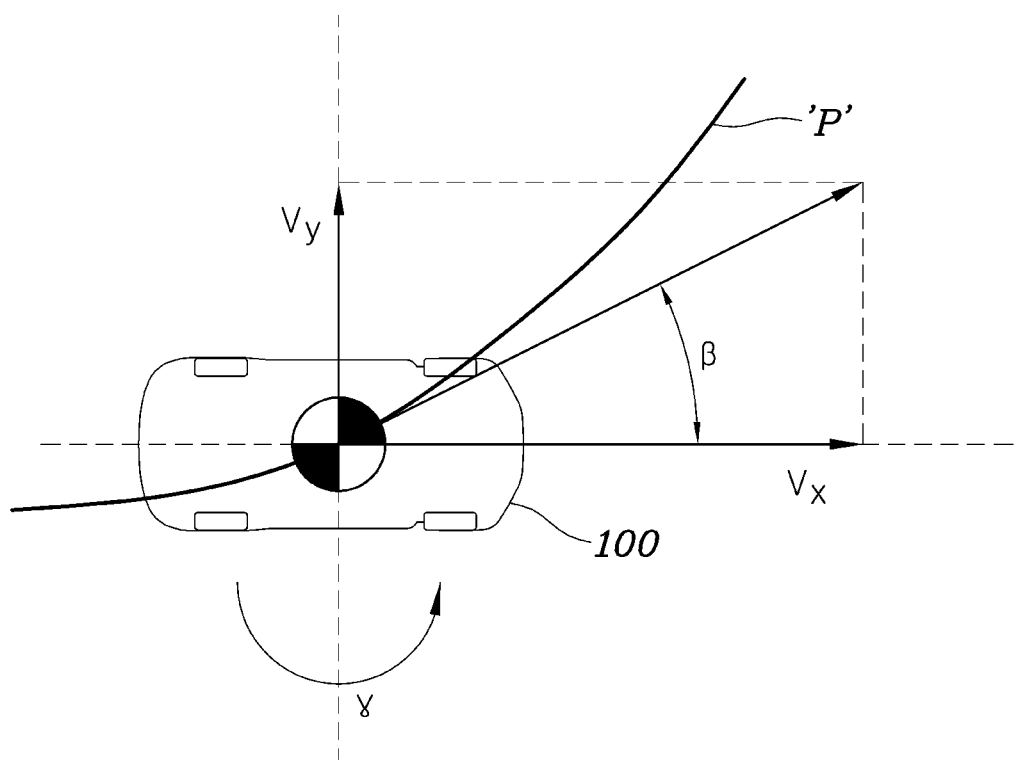
FIG. 3 illustrates an example where a slip occurs in a vehicle traveling on a curved road, for explaining the vehicle curvature radius estimating apparatus according to the embodiment of the present invention.

FIG. 3 illustrates an example where the slip occurs in the vehicle traveling on a curved road.

In FIG. 3, reference numeral "P" refers to a moving path of the vehicle, X axis refers to a forward direction of the vehicle, Y axis refers to a sideward direction of the vehicle, and an arrow refers to an instant moving direction of the vehicle, that is, a tangential direction at one point on the moving path "P". When the vehicle should move along the path "P" without a slip, X axis and the arrow should be straight lines in the same direction. However, when a slip occurs in the vehicle as illustrated in FIG. 3, a difference in an angle due to the slip by an angle β occurs. That is, because the yaw rate measured by a yaw sensor provided in the vehicle cannot reflect the angle β, the estimation of the radius of curvature of the vehicle based on only the yaw rate cannot reflect the slip of the vehicle.

The vehicle curvature radius estimating apparatus according to various embodiments of the present invention further includes a second curvature radius calculating unit 20 configured to additionally estimate the radius of curvature based on the lateral acceleration of the vehicle in consideration of the change in the radius of curvature of the vehicle, on which such a yaw rate is not reflected.

According to kinematic relationships, an acceleration (the lateral acceleration) of a moving object such as the vehicle illustrated in FIG. 3 in the y-axis direction may be obtained by multiplying a velocity change rate in the y-axis direction and a velocity in the x-axis direction by the yaw rate γ. Here, the velocity change rate in the y-axis direction may be replaced with a value obtained by multiplying the velocity in the x-axis direction by an angular velocity change rate. Such a relationship may be expressed in Equation (4).

$$A_y = V_x \gamma + \dot{V}_y = V_x \gamma + V_x \cdot \dot{\beta} \quad (4)$$

Ay refers to an acceleration in the y-axis direction, Vx is a velocity in the y-axis direction, $\dot{V}_y$ is a velocity change rate in the y-axis direction, and $\dot{\beta}$ is an angular velocity.

When a value obtained by adding an angular velocity by the slip to the yaw rate is reflected in Equation (3), the estimated radius of curvature obtained by considering a change in an angle by the slip may be derived as in Equation (5).

$$\rho = \frac{V_x}{\gamma + \dot{\beta}} \quad (5)$$

Meanwhile, when both sides in Equation (4) are divided by a square of Vx, Equation (6) is derived, and the radius of curvature estimated by Equations (5) and (6) by the second curvature radius calculating unit 20 may be derived as represented in Equation (7).

$$\frac{A_y}{V_x^2} = \frac{V_x}{\gamma + \dot{\beta}} \quad (6)$$

$$\rho = \frac{V_x}{\gamma + \dot{\beta}} = \frac{V_x^2}{A_y} \quad (7)$$

As represented in Equation (7), the second curvature radius calculating unit 20 may estimate the radius of curvature by using the lateral acceleration Ay of the vehicle and the forward velocity Vx of the vehicle (that is, the velocity measured by a velocimeter of the vehicle). Here, the lateral acceleration Ay of the vehicle and the velocity Vx of the vehicle may be easily derived by an acceleration sensor (a gyro sensor) and the velocimeter installed in the vehicle, respectively.

The curvature radius determining unit 30 may determine a final estimated radius of curvature by combining, based on a forward acceleration of the vehicle, a first estimated radius of curvature estimated based on the yaw rate by the first curvature radius calculating unit 10 and a second estimated radius of curvature estimated based on the lateral acceleration by the second curvature radius calculating unit 20.

Because the slip occurs in the vehicle when the velocity of the vehicle changes, the curvature radius determining unit 30 may determine the final estimated radius of curvature by applying the weight to the first estimated radius of curvature and the second estimated radius of curvature based on the magnitude of the forward acceleration Ax of the vehicle.

Figure 4:
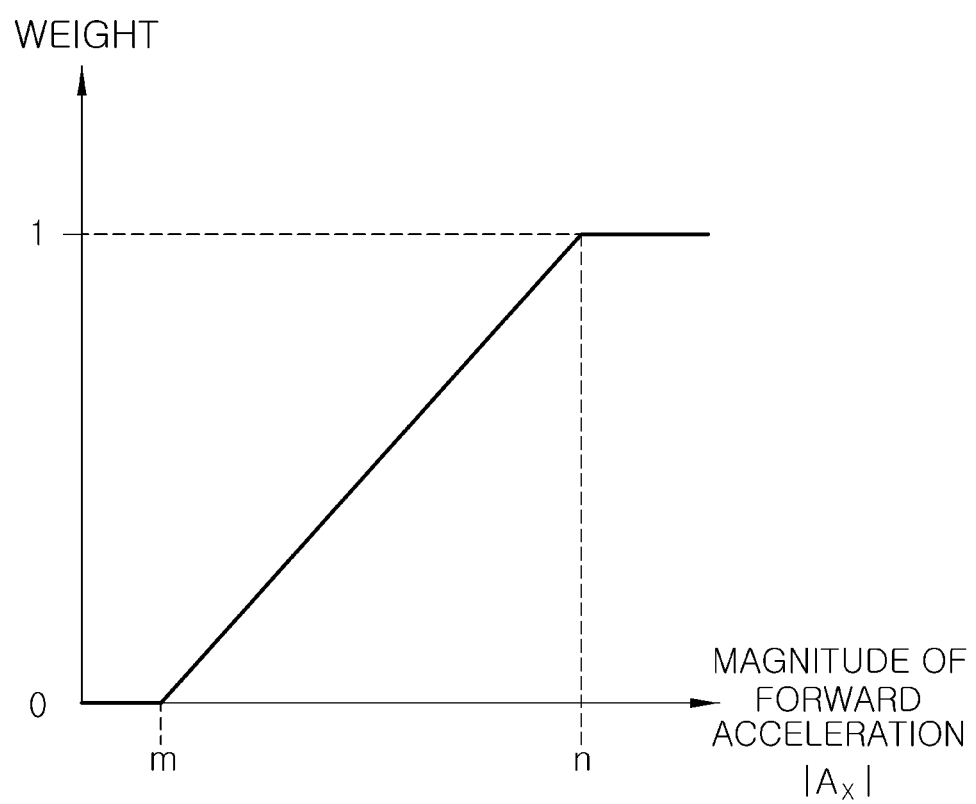
FIG. 4 illustrates an example of a weight applied in a curvature radius determining unit of the vehicle curvature radius estimating apparatus according to the embodiment of the present invention.

FIG. 4 illustrates an example of a weight applied in a curvature radius determining unit of the vehicle curvature radius estimating apparatus according to the embodiment of the present invention.

As illustrated in FIG. 4, the weight applied in the curvature radius determining unit 30 may be determined as 0 when the magnitude of the forward acceleration is lower than a predetermined first reference value m, may be determined as 1 when the magnitude of the forward acceleration exceeds a predetermined second reference value n, and may be determined to be linearly changed in a range of 0 to 1 when the magnitude of the forward acceleration is in a range of the first reference value m to the second reference value n.

Because the weight as illustrated in FIG. 4 becomes larger as the forward acceleration becomes larger, the weight is multiplied by the second estimated radius of curvature as it is, a value obtained by subtracting the weight from 1 is multiplied by the first estimated radius of curvature, and the two multiplied values are summed to determine the final radius of curvature.

In addition to the scheme in which the weight is applied, the curvature radius determining unit 30 may determine the second estimated radius of curvature as the final estimated radius of curvature when the magnitude of the forward acceleration is not less than a predetermined reference value, and may determine the first estimated radius of curvature as the final estimated radius of curvature when the magnitude of the forward acceleration is lower than the predetermined reference value.

In this way, the finally determined estimated radius of curvature may be applied to a cruise control system of the vehicle, a smart cruise control system, or an autonomous navigation system of the vehicle.

The present invention may provide a method for estimating a radius of curvature of a vehicle, which is implemented by the above-described apparatus for estimating a radius of curvature of a vehicle.

The method for estimating a radius of curvature of a vehicle according to an embodiment of the present invention may include a first estimation step of estimating a radius of curvature of a driving vehicle based on a yaw rate of the vehicle by the first curvature radius calculating unit 10, a second estimation step of estimating a radius of curvature of the vehicle based on a lateral acceleration of the vehicle by the second curvature radius calculating unit 20, and determining a final estimated radius of curvature of the vehicle by combining the estimated radii of curvature determined in the first estimation step and the second estimation step by the curvature radius determining unit 30.

Here, the first estimation step may include various data processing processes performed by the above-described first curvature radius calculating unit 10, the second estimation step may include a data processing process performed by the above-described second curvature radius calculating unit 20, and the determining of the final estimated radius of curvature may also include a data processing process performed by the above-described curvature radius determining unit 30.

As described above, in the apparatus and method for estimating a radius of curvature of a vehicle according to various embodiments of the present invention, because the radius of curvature of the vehicle is estimated in consideration of a moving trajectory of the vehicle, which is not reflected on the yaw rate due to the slip of the vehicle, in addition to the estimated radius of curvature estimated by the yaw rate of the vehicle, the radius of curvature of the vehicle may be more accurately estimated in consideration of the slip even when the vehicle decelerates/accelerates while traveling on a curved road.

Further, in the embodiment of the present, because the final radius of curvature of the vehicle is determined by properly combining the radius of curvature estimated based on the yaw rate and the radius of curvature estimated in consideration of the slip of the vehicle based on the lateral acceleration of the vehicle, the radius of curvature may be properly estimated according to a driving state of the vehicle without an excessive error that is reflected on the estimated radius of curvature estimated by any one technique.

The embodiments described herein may be implemented in hardware and/or software. For example, the calculating, determining, weight applying units, filter and second filters described above may be implemented as software stored in a non-transitional memory and running on a data processor such as a CPU, microprocessor, signal processor, graphic processor, and the like.

Although a specific embodiment of the present invention has been illustrated and described above, it is obvious to those skilled in the art that the present invention may be variously modified and changed without departing from the technical spirit of the present invention provided by the appended claims.

What is claimed is:

1. An apparatus for estimating a radius of curvature of a vehicle, the apparatus comprising:
a first curvature radius calculating unit configured to estimate a radius of curvature of the vehicle based on a yaw rate of the vehicle;
a second curvature radius calculating unit configured to estimate a radius of curvature of the vehicle based on a lateral acceleration of the vehicle; and
a curvature radius determining unit configured to determine a final radius of curvature of the vehicle by combining the estimated radius of curvature estimated by the first curvature radius calculating unit and the estimated radius of curvature estimated by the second curvature radius calculating unit.

2. The apparatus of claim 1, wherein the first curvature radius calculating unit estimates the radius of curvature based on the yaw rate and a velocity of the vehicle using an equation, $$\rho = \frac{V_x}{\hat{\gamma}},$$

wherein ρ refers to the estimated radius of curvature, Vx refers to the velocity of the vehicle, and $\hat{\gamma}(k)$ refers to the yaw rate.

3. The apparatus of claim 1, wherein the second curvature radius calculating unit estimates the radius of curvature based on the lateral acceleration of the vehicle and a velocity of the vehicle using an equation, $$\rho = \frac{V_x^2}{A_y},$$

wherein ρ refers to the estimated radius of curvature, Vx refers to the velocity of the vehicle, and Ay refers to the lateral acceleration of the vehicle.

4. The apparatus of claim 1, wherein the curvature radius determining unit determines the final radius of curvature by combining, based on the magnitude of a forward acceleration of the vehicle, a first estimated radius of curvature estimated by the first curvature radius calculating unit and a second estimated radius of curvature estimated by the second curvature radius calculating unit.

5. The apparatus of claim 4, wherein the curvature radius determining unit determines the final radius of curvature by applying a weight to the first estimated radius of curvature and the second estimated radius of curvature based on the magnitude of the forward acceleration of the vehicle.

6. The apparatus of claim 5, wherein the weight is determined as 0 when the magnitude of the forward acceleration is lower than a predetermined first reference value, wherein the weight is determined as 1 when the magnitude of the forward acceleration exceeds a predetermined second reference value, and wherein the weight is determined to be linearly changed in a range of 0 to 1 when the magnitude of the forward acceleration is in a range of the first reference value to the second reference value, and wherein the curvature radius determining unit multiplies the weight by the second estimated radius of curvature to obtain a first multiplied value, multiplies a value obtained by subtracting the weight from 1 by the first estimated radius of curvature to obtain a second multiplied value, and adds the first and the second multiplied values to determine the final radius of curvature.

7. The apparatus of claim 4, wherein the curvature radius determining unit determines the second estimated radius of curvature as the final radius of curvature when the magnitude of the forward acceleration is not less than a predetermined reference value, and determines the first estimated radius of curvature as the final radius of curvature when the magnitude of the forward acceleration is lower than the reference value.

8. A method for estimating a radius of curvature of a vehicle, the method comprising:
a first estimation step of estimating a radius of curvature of a driving vehicle based on a yaw rate of the vehicle;
a second estimation step of estimating a radius of curvature of the vehicle based on a lateral acceleration of the vehicle; and
determining a final estimated radius of curvature of the vehicle by combining the estimated radii of curvature estimated in the first estimation step and the second estimation step, respectively, with each other.

9. The method of claim 8, wherein in the first estimation step, the radius of curvature is estimated based on the yaw rate and a velocity of the vehicle using an equation, $$\rho = \frac{V_x}{\hat{\gamma}},$$

wherein ρ refers to the estimated radius of curvature, Vx refers to the velocity of the vehicle, and $\hat{\gamma}(k)$ refers to the yaw rate).

10. The method of claim 8, wherein in the second estimation step, the radius of curvature is estimated based on the lateral acceleration of the vehicle and a velocity of the vehicle using an equation, $$\rho = \frac{V_x^2}{A_y},$$

wherein ρ refers to the estimated radius of curvature, Vx refers to the velocity of the vehicle, and Ay refers to the lateral acceleration of the vehicle.

11. The method of claim 8, wherein in the determining of the final estimated radius of curvature of the vehicle, the final estimated radius of curvature is determined by combining the first estimated radius of curvature estimated in the first estimation step and the second estimated radius of curvature estimated in the second estimation step.

12. The method of claim 11, wherein in the determining of the final estimated radius of curvature of the vehicle, the final estimated radius of curvature is determined by applying a weight to the first estimated radius of curvature and the second estimated radius of curvature based on a magnitude of a forward acceleration of the vehicle.

13. The method of claim 12, wherein the weight is determined as 0 when the magnitude of the forward acceleration is lower than a predetermined first reference value, wherein the weight is determined as 1 when the magnitude of the forward acceleration exceeds a predetermined second reference value, and wherein the weight is determined to be linearly changed in a range of 0 to 1 when the magnitude of the forward acceleration is in a range of the first reference value to the second reference value, and wherein in the determining of the final estimated radius of curvature of the vehicle, the weight is multiplied by the second estimated radius of curvature to obtain a first multiplied value, a value obtained by subtracting the weight from 1 is multiplied by the first estimated radius of curvature to obtain a second multiplied value, and the first and the second multiplied values are added to determine the final estimated radius of curvature.

14. The method of claim 11, wherein in the determining of the final estimated radius of curvature of the vehicle, the second estimated radius of curvature is determined as the final estimated radius of curvature when the magnitude of a forward acceleration of the vehicle is not less than a predetermined reference value, and the first estimated radius of curvature is determined as the final estimated radius of curvature when the magnitude of the forward acceleration is lower than the reference value.

15. An apparatus for estimating a radius of curvature of a vehicle, the apparatus comprising:
a processor;
a memory for storing a program to be executed in the processor, the program comprising instructions for
estimating a first radius of curvature of the vehicle based on a yaw rate of the vehicle;
estimating a second radius of curvature of the vehicle based on a lateral acceleration of the vehicle; and
determining a final radius of curvature of the vehicle by combining the first radius of curvature and the second radius of curvature.

16. The apparatus of claim 15, wherein estimating the first radius of curvature of the vehicle based on the yaw rate comprises estimating the first radius of curvature based on the yaw rate and a velocity of the vehicle using an equation, $$\rho = \frac{V_x}{\hat{\gamma}},$$

wherein ρ refers to the estimated radius of curvature, Vx refers to the velocity of the vehicle, and $\hat{\gamma}(k)$ refers to the yaw rate.

17. The apparatus of claim 15, wherein estimating the second radius of curvature of the vehicle based on the lateral acceleration comprises estimating the second radius of curvature based on the lateral acceleration of the vehicle and a velocity of the vehicle using an equation, $$\rho = \frac{V_x^2}{A_y},$$

wherein ρ refers to the estimated radius of curvature, Vx refers to the velocity of the vehicle, and Ay refers to the lateral acceleration of the vehicle.

18. The apparatus of claim 15, wherein determining the final radius of curvature comprises combining, based on the magnitude of a forward acceleration of the vehicle, the first radius of curvature, and the second radius of curvature.

19. The apparatus of claim 18, wherein determining the final radius of curvature comprises determining the final radius of curvature by applying a weight to the first radius of curvature and the second radius of curvature based on the magnitude of the forward acceleration of the vehicle.

20. The apparatus of claim 19, wherein the weight is determined as 0 when the magnitude of the forward acceleration is lower than a predetermined first reference value, wherein the weight is determined as 1 when the magnitude of the forward acceleration exceeds a predetermined second reference value, and wherein the weight is determined to be linearly changed in a range of 0 to 1 when the magnitude of the forward acceleration is in a range of the first reference value to the second reference value, and wherein the determining the final radius of curvature further comprises multiplying the weight by the second radius of curvature to obtain a first multiplied value, multiplying a value obtained by subtracting the weight from 1 by the first radius of curvature to obtain a second multiplied value, and adding the first and the second multiplied values to determine the final radius of curvature.

* * * * *